United States Patent
Klein et al.

(10) Patent No.: US 7,546,868 B2
(45) Date of Patent: Jun. 16, 2009

(54) AIR-CONDITIONER HOUSING

(75) Inventors: Henri Klein, Colmar (FR); Evripidis Koukouravas, Nekartenzlingen (DE)

(73) Assignees: Behr GmbH & Co. KG, Stuttgart (DE); Behr France S.A.R.L., Roffach (FR)

( * ) Notice: Subject to any disclaimer, the term of this patent is extended or adjusted under 35 U.S.C. 154(b) by 621 days.

(21) Appl. No.: 10/522,917

(22) PCT Filed: May 26, 2003

(86) PCT No.: PCT/EP03/05518

§ 371 (c)(1),
(2), (4) Date: Mar. 14, 2005

(87) PCT Pub. No.: WO2004/014676

PCT Pub. Date: Feb. 19, 2004

(65) Prior Publication Data

US 2006/0090890 A1    May 4, 2006

(30) Foreign Application Priority Data

Jul. 29, 2002   (DE) ............................. 102 35 513
Dec. 17, 2002   (DE) ............................. 102 61 037

(51) Int. Cl.
*B60H 1/00* (2006.01)

(52) U.S. Cl. ............. 165/203; 165/202; 165/204; 165/103; 454/156; 454/160; 454/161; 237/12.3 A; 237/12.3 B (58) Field of Classification Search ............ 165/202, 165/203, 204, 42, 43, 103; 454/156, 160, 454/161; 237/12.3 A, 12.3 B
See application file for complete search history.

(56) References Cited

U.S. PATENT DOCUMENTS

| | | | |
|---|---|---|---|
| 4,482,009 A | 11/1984 | Nishimura et al. | |
| 5,975,422 A | 11/1999 | Ordberg | |
| 6,192,698 B1 | 2/2001 | Kakehashi et al. | |

(Continued)

FOREIGN PATENT DOCUMENTS

DE         35 14 359 A1      10/1986

(Continued)

OTHER PUBLICATIONS

Japanese Office Action; JP 2004-526673; dated Jan. 13, 2009; 3 pages.

*Primary Examiner*—John K Ford
(74) *Attorney, Agent, or Firm*—Foley & Lardner LLP (57) ABSTRACT

An air conditioner housing having an evaporation device, a heating device, an air control device, an interior space in which air flow paths are formed, and having a housing which surrounds the interior space, is proposed. The air conditioner housing (1) is defined in that a first air flow path (15) and a second air flow path (17) are formed, and in that the air control device (9) has at least two mixing flaps (11, 13), a first mixing flap (11) of which is designed to the first air flow path (15), and a second mixing flap (13) of which is assigned to the second airflow path (17), and in that the mixing flaps (11, 13) each completely open the assigned air flow path (15, 17) in a first functional position and completely close it in a second functional position.

16 Claims, 5 Drawing Sheets

U.S. PATENT DOCUMENTS 6,599,182 B1 * 7/2003 Schwarz .................... 454/156
6,761,210 B1   7/2004 Arold

FOREIGN PATENT DOCUMENTS

| | | |
|---|---|---|
| DE | 43 43 367 C2 | 6/1994 |
| DE | 44 22 120 A1 | 1/1996 |
| DE | 4422120 A1 * | 1/1996 |
| DE | 197 39 578 C2 | 3/1999 |
| DE | 199 19 132 A1 | 11/1999 |
| DE | 199 19 975 C1 | 9/2000 |
| DE | 100 51 043 A1 | 4/2002 |
| DE | 100 56 670 A1 | 5/2002 |
| EP | 1 070 611 A1 | 1/2001 |
| JP | 6-270654 | 9/1994 |
| JP | 07-076207 | 3/1995 |
| JP | 10-250346 | 9/1998 |
| JP | 11-291742 | 10/1999 |
| JP | 2000-038016 | 2/2000 |
| JP | 2000 168335 | 6/2000 |
| JP | 2000-190722 | 7/2000 |
| JP | 2002-046453 | 2/2002 |
| WO | WO 96/29211 A1 | 9/1996 |

* cited by examiner

Fig.4

AIR-CONDITIONER HOUSING

BACKGROUND

The invention relates to an air conditioner housing.

Air conditioner housings of the type in question here are used in particular in conjunction with vehicle air conditioner devices for heating and air conditioning the passenger compartment of a vehicle. An air conditioner housing of the type in question here is known, for example, from European Patent Application EP 1070611 A1. It has an evaporation device, a heating device and an air control device which are accommodated in the interior of the air conditioner housing, in which air flow paths are formed in order to heat and cool to a greater or lesser extent the air flowing into the air conditioner housing, and to distribute it into various areas of the vehicle. It has been found here that with only a small degree of structural expenditure it is possible to provide different areas of the passenger compartment of the vehicle with airstreams at different temperatures.

The object of the invention is therefore to provide an air conditioner housing which is small in size while providing the possibility of supplying different areas of the passenger compartment of the vehicle with air streams at different temperatures.

SUMMARY

In order to achieve this object, an air conditioner housing is proposed which exhibits the features described herein. It is defined by the fact that a first airflow path and a second airflow path are formed, and that an air control device has at least two mixing flaps, a first mixing flap of which is assigned to the second airflow path. The mixing flaps are arranged and embodied in such a way that they completely open the associated airflow path in a first functional position, and completely close it in a second functional position. In this way it is possible to influence different airflow paths independently of one another using separate mixing flaps in such a way that the temperature conditions in the airflow paths can be set separately.

BRIEF DESCRIPTION OF THE DRAWINGS

The invention is explained in more detail below with reference to the drawings, in which.

DETAILED DESCRIPTION

Figure 1:
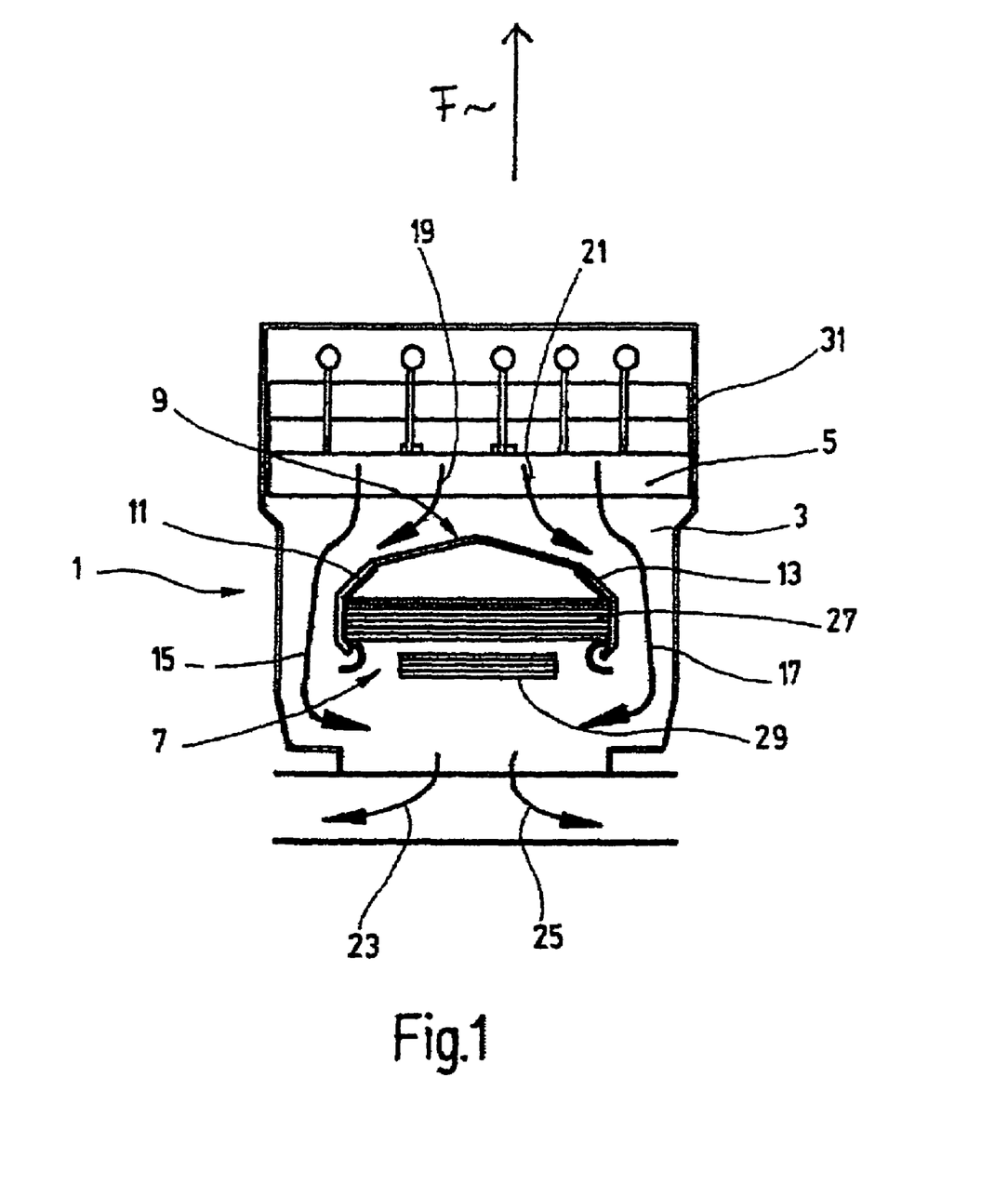
FIG. 1 shows a basic outline of an air conditioner housing in an operating mode for maximum cooling power.

FIG. 1 shows a basic outline of an air conditioner housing 1 in section so that the interior space 3 of the air conditioner housing 1 can be seen. The air conditioner housing 1 is demonstrated here in a plan view, the upper side of the air conditioner housing 1 in FIG. 1 pointing in the direction of travel (arrow F). In the latter there is an evaporation device 5, and also a heating device 7, as well as an air control device 9. The latter comprises a first mixing flap 11 and a second mixing flap 13 which are in the first functional position and thus open two airflow paths 15 and 17 which are indicated by arrows.

The air which is introduced into the air conditioner housing 1 via blower (not illustrated) flows through the evaporation device 5 and is cooled there. In the illustration according to FIG. 1, air which flows to the rear from the front is deflected by the first and second mixing flaps 11, 13 and guided past the heating device 7, which is indicated by arrows 19 and 21, so that the airflow paths 15 and 17 are formed. The cold air leaves the air conditioner housing 1 at the rear, which is indicated by arrows 23 and 25.

The mixing flaps 11 and 13 cover the heating device 7 completely, so that no air components flow through the latter in the operating mode of the air conditioner housing which is illustrated here, and the maximum cooling power is thus made available.

The air conditioner housing 1 is therefore illustrated in an operating mode in which the air flows exclusively through the evaporation device 5 and is cooled there. It is guided completely past the heating device 7 via the air control device 9, two airflow paths 15 and 17 being formed in the interior space 3 of the air conditioner housing 1 and leaving the air conditioner housing 1 and being directed into the passenger compartment of a vehicle in accordance with the arrows 23 and 25.

FIG. 1 shows that the heating device 7 is arranged centrally in the interior space 3 so that the air can be guided around the heating device 7 in the region of the airflow paths 15 and 17 to the right and left of the heating device 7. It is already apparent from the basic outline that the heating device 7 is covered by the mixing flaps 11 and 13 of the air control device 7 in a planar fashion and thus provides only a small air resistance. This leads, on the one hand, to a situation in which the air resistance within the air conditioner housing 1 is relatively low so that when the blower power remains the same the quantity of air is greater in the air conditioner housing 1 as illustrated here than in the conventional air conditioner housings, and on the other hand less noise is generated, which increases the comfort within the vehicle.

The basic outline shows that the heating device 7 has a regular heating element 27 which can supply heat via the cooling water of a motor vehicle, and also an electric heating element 29, for example a PCT heater.

The air conditioner housing 1 has a housing 31 which surrounds the evaporation device, the heating device and the air control device.

Figure 2:
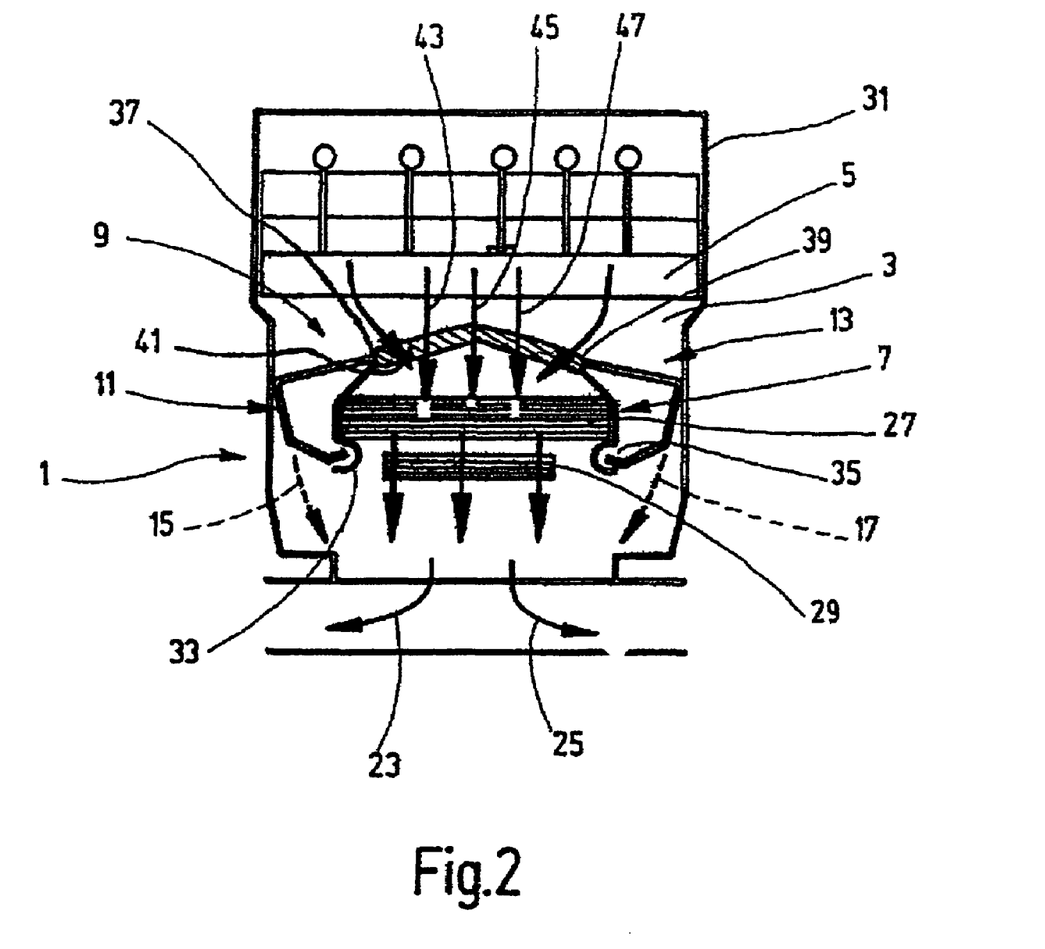
FIG. 2 shows a basic outline of an air conditioner housing in an operating mode for maximum heating power.

FIG. 2 shows a basic outline of the air conditioner housing 1 in an operating mode for maximum heating power. Identical parts are provided with identical reference numbers so that in this respect reference is made to the description relating to FIG. 1.

The flow paths 15 and 17 which are illustrated in FIG. 1 are interrupted in the functional position of the mixing flaps 11 and 13 which is illustrated here, and is therefore illustrated only by dots. The mixing flaps are pivoted outward from their position illustrated in FIG. 1 by drives 33 and 35 which are only indicated here, with the result that said mixing flaps bear in a seal-forming fashion against the wall of the housing 31, and in the process the rear subsection of the first mixing flap 11 which bears directly against the drive 33 is pivoted to the left in the counter-clockwise direction, and the rear subsection of the second mixing flap 13 which is arranged on the right and is connected to the drive 35 is pivoted to the right in the clockwise direction. The ends 37 and 39 of the mixing flaps 11 and 13 which face away from the drive 33 or 35 are guided in a guide, here a slotted guide mechanism with a running rail 41. Here, the front subsections of the first mixing flap 11 and of the second mixing flap 13 are pivoted with respect to the rear subsections, which are assigned to the drives 33 and 35. This is possible by virtue of the fact that the mixing flaps are embodied in two parts, and the front subsection of the mixing flaps 11 and 13 which is assigned to the running rail 41 is connected to the rear subsection, which is assigned to the drive 33 or 35, so as to be capable of moving with respect to said subsection, said connection being preferably by means of a hinge. A connection by means of a film hinge is particularly preferred. The moveable connection between the two subsections of the mixing flaps 11 and 13 can also be implemented by injection moulding an elastic material into the connecting region. In this embodiment it is ensured that in the connecting region of the subsections air cannot pass through the mixing flaps 11 and 13. However, it is also conceivable to make the subsections of the mixing flaps 11 and 13 completely separate and to clip them to one another, for example, in the connecting region. However, the subsections can also be connected to one another so as to be moveable by means of a common axis. In this case, refinements can also be selected in which air could pass through the mixing flaps 11 and 13 in the connecting region of the subsections. Then, if necessary, it is, on the other hand, also possible to ensure that the connecting region is sealed in a air-tight fashion.

Owing to this refinement it is possible to pivot the rear subsection outward by means of the drive and thus draw the front subsection of the mixing flaps 11 and 13 outward against the housing wall 31. The ends 37 and 39 of the mixing flaps 11 and 13 are guided in the running rail 41 here in such a way that in the second functional position the air flowing through the evaporation device 5 is directed exclusively through the heating device 7 in accordance with the arrows 43, 45 and 47, and from said heating device 7 into the passenger compartment of the vehicle in accordance with the arrows 23 and 25.

Since the mixing flaps 11 and 13 completely cover the flow paths 15 and 17, air cannot enter the passenger compartment of the vehicle by bypassing the heating device 7, so that the full heating power is therefore available.

From the basic outlines in FIGS. 1 and 2 it is clear that the mixing flaps 11 and 13 are of mirror-inverted design and are arranged symmetrically in the air conditioner housing 1. The drives 33 and 35 are arranged at a corresponding distance from one another on opposite sides of the heating device 7.

The air control device 9 which has the two mixing flaps 11 and 13 takes up very little installation space because, as is apparent from FIG. 1, in the first functional position of the mixing flaps 11 and 13, in which the air flow paths 15 and 17 are completely opened, they bear against the heating device 7 from the outside. At the same time, they form, as it were, a flat gable over the heating device 7 so that said device is covered in a planar fashion, which provides the abovementioned advantages. Furthermore, it is apparent that very little installation space is necessary between the evaporation device 5 and the heating device 7, which is in turn very advantageous for the compact design of the air conditioner housing 1.

The drive 33 and 35 can be implemented in different ways. It is decisive that the rear subsections of the mixing flaps 11 and 13 can be pivoted by the drive 33 or 35 in order, on the one hand, to clear a path for the air stream through the heating device 7 or, on the other hand, to close off this air stream completely and clear the air flow paths 15 and 17.

It is possible to divide the air stream which is provided by the heating device 7 and is indicated by the arrows 43 to 47 in FIG. 2, and to ensure two separate air flow paths through the heating device 7. It is thus possible to guide a warm air path to the left hand side of a vehicle corresponding to the arrow 23, and to direct a warm air current to the right hand side of the vehicle corresponding to the arrow 25. The first airflow path 15 would then be correspondingly assigned to the left hand side, and the second air flow path 17 to the right hand side of the passenger compartment of the vehicle.

If the mixing flaps 11 and 13 are opened and closed in synchronism, what is referred to as a single-zone air conditioner system is obtained. If the mixing flaps 11 and 13 are opened and closed independently of one another by the respectively assigned drive 33 and 35, the temperature on the right hand side and left hand side of a passenger compartment can be set independently of one another.

In addition it is possible to divide the mixing flaps 11 and 13—which extend perpendicularly with respect to the plane of the figure—in two with the result that there are therefore two mixing flaps located one next to the other on the left and also two mixing flaps located one next to the other on the right. The mixing flaps are then therefore located opposite one another in pairs.

If all four mixing flaps are separated and adjusted independently of one another, a four-zone air conditioner system is produced. If two mixing flaps which are located opposite one another are moved independently of one another and the two other mixing flaps which are located opposite one another are moved in synchronism with one another, a three-zone air conditioner system is produced.

The heating device 7 and the air control device 9 can be embodied as a unit, as a module. It is therefore possible to easily implement single-zone, two-zone, three-zone and four-zone air conditioner systems.

If separate drives are selected for each mixing flap, all that is necessary to implement the various types of air conditioner is to appropriately configure the means for actuating the drives, that is to say the drives are actuated completely independently of one another or, if appropriate, mixing flaps which are located opposite one another are actuated in pairs. It is particularly preferred to configure the drives as stepping motor so that sensitive temperature control or regulation can be implemented.

It is therefore possible here to move the mixing flaps of the air control device 9 into the first and second functional positions, that is to say to ensure a maximum cooling power and a maximum heating power. Furthermore, it is, of course, possible to assume intermediate positions in which the air passes out of the evaporation device and in part along the flow paths 15 and 17 and is guided in part through the heating device 7 so that a desired temperature can be set at the outlet of the air conditioner system 1, it being possible to apply different temperatures to one, two, three or four zones.

Figure 3:
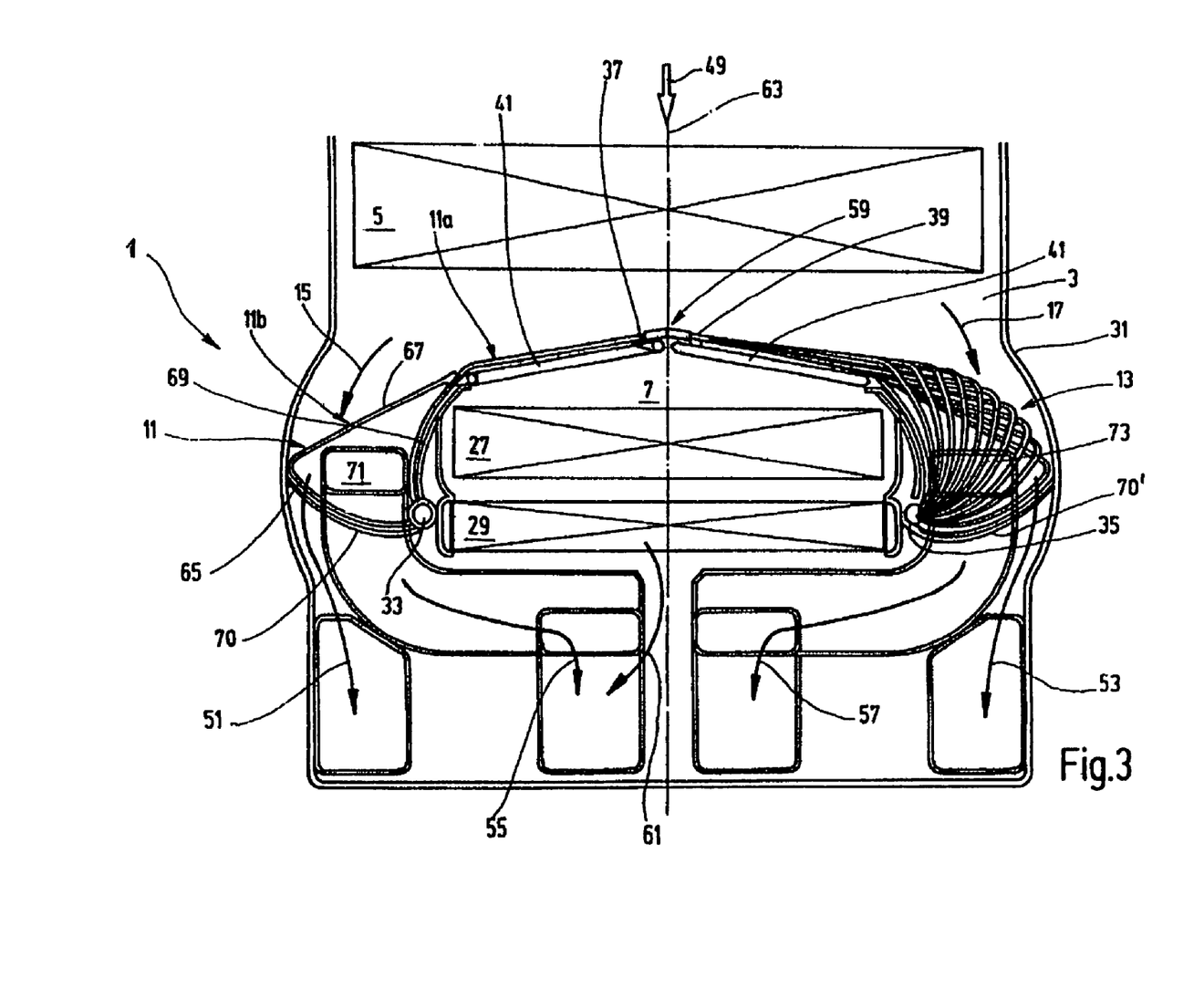
FIG. 3 shows a sectional view through an air conditioner housing with mixing flaps in various functional positions.

FIG. 3 is a sectional view of an air conditioner system 1 with the mixing flaps 11 and 13 of an air control device 9 in various functional positions. Identical parts are provided with identical reference numerals so that in this respect reference is made to the description relating to the preceding figures.

The air supplied by a blower, which is indicated by an arrow 49, passes through the evaporation device 5 and, as one alternative, is guided past the heating device 7 and flows along the flow paths 15 and 17. In this context it may pass, for example, to the foot well rear left, which is indicated by an arrow 51, or into the foot well rear right, which is indicated by an arrow 53. However, the air can also be guided to the rear left for the purpose of ventilation, which is indicated by an arrow 55, or rear right for ventilation, which is indicated by an arrow 57.

The arrows 51 to 57 indicate the cold air flows which occur when the mixing flaps 11 and 13 are in their first functional position which is also illustrated in FIG. 1 and the heating device 7 is closed off at the front in a sealed fashion. For this purpose, a sealing rail which extends perpendicularly with respect to the plane of the figure can be provided in a gable region 59, the ends 37 and 39 of the mixing flaps 11 and 13 running up against said sealing rail in their first functional position. The ends 37, 39 can, of course, also be embodied in such a way that they bear against one another in a directly sealed fashion in the first functional position.

FIG. 3 shows once more the running rail 41 in which the ends 37 and 39 are guided when the mixing flaps 11 and 13 are moved out of their first functional position.

The section illustrated here clearly shows the drive 35 of the first mixing flap 11 and the drive 35 of the second mixing flap 13. The first mixing flap 11 is represented in two functional positions, namely in the first functional position which is characterized by 11a, in which the heating device 7 is closed off from the evaporation device 5, and in the second functional position 11b in which the flow path 15 is interrupted and all of the air from the evaporation device 15 is directed through the heating device 7 and passes to the left hand foot well and to the left hand ventilation means in accordance with the arrow 61. The air can also pass to the right hand side of the passenger compartment of the vehicle if a partition wall is not provided here perpendicularly in the centre plane 63, and said wall has to be provided in the right hand and left hand sides of the passenger compartment of the vehicle are to have different temperatures applied to them, in either two zone or four zone air conditioner systems.

The mixing flaps 11 and 13 which are arranged opposite one another in pairs can be actuated in synchronism by means of the drives 33 and 35 or else separately, as described above, in order to be able to set different temperatures in the right hand and left hand areas of the vehicle.

On the right hand side, the second mixing flap 13 is represented in various functional positions in order to indicate that the cold air which follows the right hand flow path 17 can be decreased to a greater or lesser extent in order to guide more or less air through the heating device 7.

FIG. 3 shows clearly that the first mixing flap 11 has a first component mixing flap 65 in the lower subsection and a second component mixing flap 67 in the upper subsection and these are connected to one another in an articulated fashion such that the angle enclosed between the component mixing flaps 65 and 67 is variable: in the first functional position in which the heating device 7 is closed off, the two component mixing flaps 65 and 67 enclose an obtuse angle with one another, and in the second functional position in which the first flow path 15 is interrupted the component mixing flaps 65 and 67 enclose an acute angle with one another. The two component mixing flaps are therefore attached to one another in a moveable, that is to say pivotable, fashion, preferably by means of a film hinge. Other embodiments of the invention have been explained above.

The second mixing flap 13 is of symmetrical design as is the first mixing flap 11 so that no more details on this will be given here.

If the air conditioner housing 1 does not have merely two mixing flaps 11 and 13 assigned to one another in pairs but instead four, the second pair is located behind the first pair of mixing flaps which extend perpendicularly into the plane 3 of the figure. In this context it is possible to assign a common drive to the mixing flaps or a separate drive to each mixing flap in order to be able to apply air at different temperatures to one to four zones of the passenger compartment as flexibly as possible.

FIG. 3 shows once more clearly that the air control device 9 requires very little space because in the first functional position the mixing flaps bear directly against the housing 69 of the heating device 7. If the mixing flaps 11 and 13 are moved into their outwardly pivoted position, they bear in a seal-forming fashion with the connecting region of the two component mixing flaps against the inner wall of the housing 31 so that there is no need here for a further seal-forming device, which significantly reduces the structural expenditure for the air conditioner housing 1 and its complexity.

The mixing flaps 11 and 13 have seal-forming devices on their side edges, preferably a circumferential sealing edge which bears against the inside of the housing 31 and prevents air from being able to flow past the side of the mixing flaps. This ensures a complete separation of the air flows which are formed in the air conditioner housing 1. What are referred to as creepage openings are also avoided.

In the illustration depicted in FIG. 3, the sealing edges are located on the side edges of the mixing flap 11 facing the viewer, or their component mixing flaps 65 and 67, and the mixing flap 13, that is to say its component mixing flaps.

In addition, a sealing edge 70, 70' can also be provided on the right and left of the inner wall of the housing 31 along which the side edges of the mixing flaps 11 and 13 extend, said sealing edge 70, 70' projecting somewhat into the interior space of the housing 31 and serving, as it were, as a stop for the mixing flaps 11 and 13 in their second functional position. For this purpose, the contour of the sealing edge 70, 70' is adapted to the contour of the first component mixing flap 65 of the two mixing flaps 11 and 13 so that they bear against the sealing edge 70, 70' in a planar, seal-forming fashion.

The air control device 9 is characterized by a particularly simple design. The different temperatures of the air emerging at the outlet of the air conditioner housing 1 can be set solely by means of the mixing flaps, of which the mixing flaps 11 and 13 are illustrated here.

Figure 4:
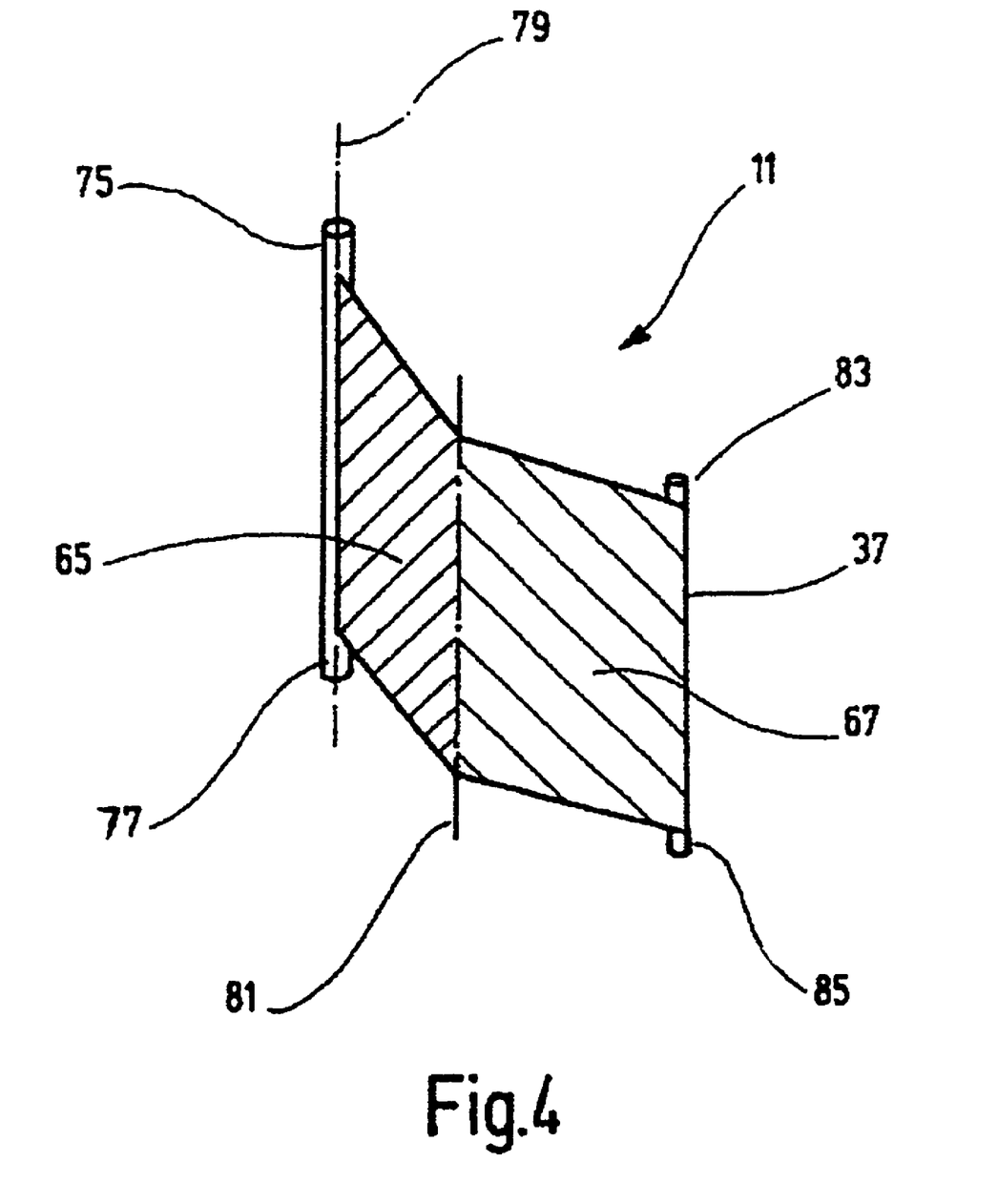
FIG. 4 shows a perspective view of a mixing flap.

FIG. 4 is a perspective view of a mixing flap, for example a mixing flap 11 of the air control device 9. The first component mixing flap 65 and the second component mixing flap 67, which are connected to one another in an articulated fashion, preferably by means of a film hinge, can be seen clearly here.

Stub axles 75 and 77 which can interact with a suitable drive which has been described above and has the purpose of activating the mixing flap 11 by pivoting the component mixing flap 65 about the rotational axis 79, are provided on the left.

In particular in FIG. 3, it becomes clear with respect to the mixing flap 13 that the second component mixing flap 67 is pivoted about a pivot axis 81 when the first component mixing flap 65 pivots and is moved on a circular path about the rotational axis 79. This applies of course also to the mixing flap 11 which is embodied and arranged in a symmetrical fashion.

Two guide pins 83 and 85, which are part of the means of guiding the mixing flap 11 and are moved in the running rail 41, can be seen at the end face 37 of the mixing flap 11 located opposite the stub axles 75 and 77.

It is apparent here that guides, that is to say running rails, are preferably present on both sides of a mixing flap.

FIG. 4 shows clearly that the mixing flap 11 is of very simple design. The design illustrated here applies to all the mixing flaps of an air conditioner housing 1 which has been explained with reference to FIGS. 1 to 3. It is also apparent that the space required for such a mixing flap is very small so that the air conditioner housing 1 can be very compact.

Figure 5:
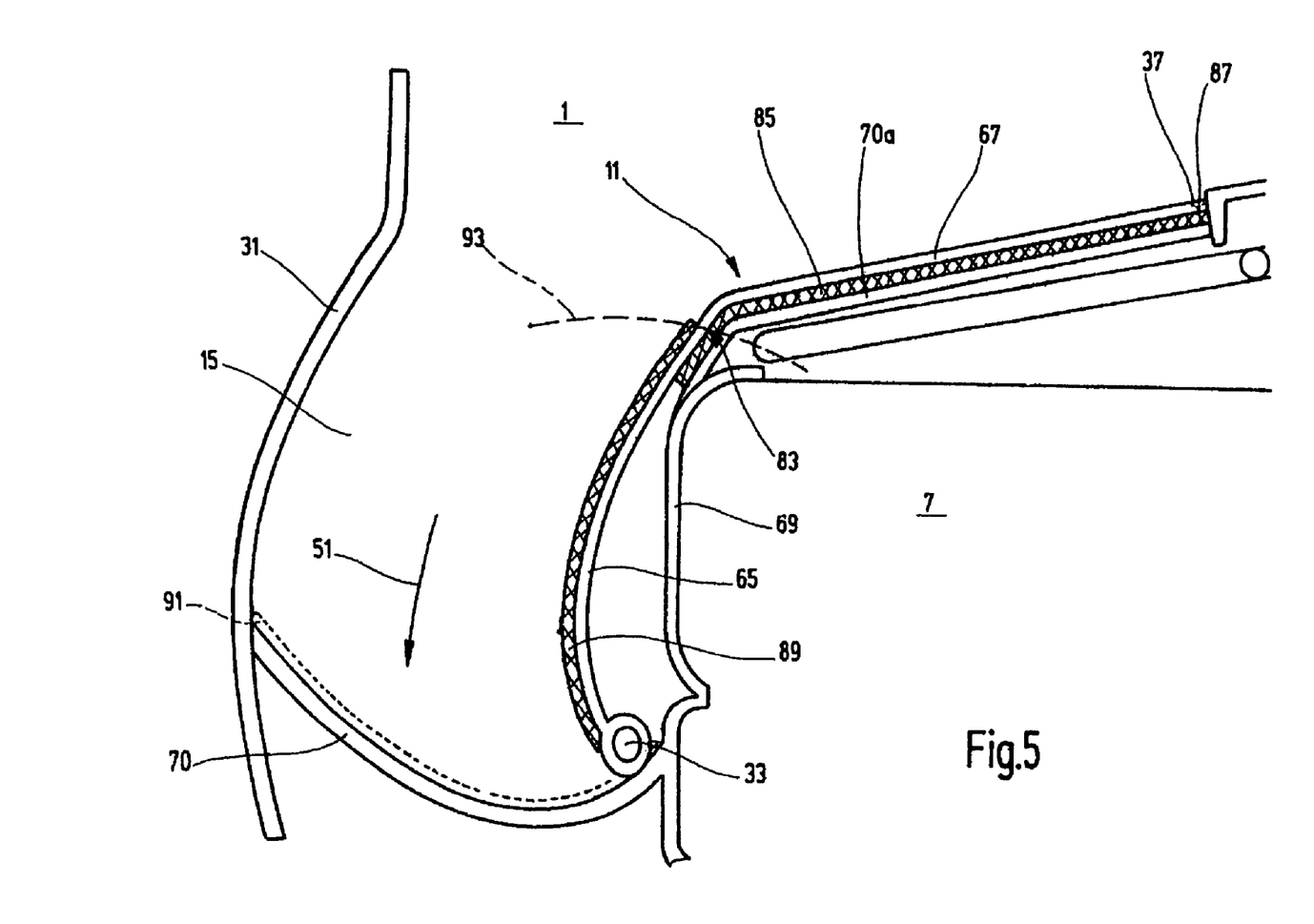
FIG. 5 shows a sectional view through part of an air conditioner housing.

FIG. 5 shows a sectional view of part of an air conditioner housing 1 in a highly enlarged form. Identical parts are provided with identical reference numbers so that in this respect reference is made to the description relating to the preceding figures.

FIG. 5 shows part of the housing 69 which surrounds the heating device 7 which is not illustrated in detail here. The mixing flap 11 is illustrated here in its first functional position so that air flowing into the air conditioner housing 1 is not guided through the heating device 7. Rather, heating device 7 is closed off completely by the mixing flap 11.

The mixing flap 11 has in turn two component mixing flaps 65 and 67 which are connected to one another in a moveable fashion. The connecting region 83 is indicated here by an arrow.

In the closed state of the mixing flap 11 illustrated here, the component mixing flap 67 bears in a planar fashion along its side edge on a first flap seal 85 so that air cannot flow past the side edges and into the heating device 7. The first flap seal 85 bears on a sealing edge 70a and is thus pressed in a planar fashion against the underside of the second component mixing flap 67 of the mixing flap 11. In the functional position illustrated here, the end 37 of the mixing flap 11 is pressed against a sealing strip 87 in order to prevent a flow of air through the heating device 7 in the closed state of the mixing flap 11. A heating medium, for example the cooling fluid of an internal combustion engine, generally flows continuously through said heating device 7. For this reason, if the maximum cooling power is requested, it is necessary to prevent the heat from the heating device 7 passing into the air stream flowing through the air conditioner housing 1.

At the region of the mixing flap 11 which faces away from the end 37, a drive 33 is provided which pivots the first component mixing flap 65, the second component mixing flap 67 then respectively also being moved. In FIG. 5, the first component mixing flap 65 is then in its position in which it is pivoted completely to the right and in which the mixing flap 11 closes off the heating device 7 in a seal-forming fashion and guides the entire volume of air around the outside of the heating device so that the air flow path 15 which is indicated by the arrow 51, and which includes only cold air, is implemented.

In the exemplary embodiment illustrated in FIG. 5, a second flap seal 89, which extends from the drive 33 to the connecting region 83, is provided on the outside of the first component mixing flap 65 facing away from the heating device 7. If the first component mixing flap 65 is pivoted to the left, that is to say in the counter clockwise direction, by the drive 33, the second flap seal 89 bears against the inner face of the housing 31 and against the sealing edge 70.

If the mixing flap 11 is therefore moved in the counter clockwise direction and entirely into its outwardly pivoted position, the first airflow path 15 is closed off by the second flap device 85 in a sealed fashion so that cold air cannot flow out of the air conditioner housing 1. The entire air stream is therefore guided through the heating device 7.

It becomes apparent here that, as indicated by a dashed line 91, the second flap seal 89 which is provided in the region of the first component mixing flap 65 can also be omitted and instead be provided on the sealing edge 70. As a result, the first component mixing flap 65 acts exclusively as an activation element for the second component mixing flap 67 and no longer has to contribute to sealing the first air flow path 15.

FIG. 5 also shows that the first flap seal 85, which is provided at least in the region of the second component mixing flap 67, can extend beyond the connecting region 83 so that in the first functional position illustrated here the first component mixing flap 65 also bears in part against the first flap device 85. As a result it is possible, as explained above, also to construct the connecting region 83 in such a way that air can always flow through it. This is not disadvantageous because in the case illustrated here, in which the heating device 7 is to be sealed off, the first flap device 85 extends over the connecting region 83 and thus closes it off from the inside in a seal-forming fashion.

When the first component mixing flap 65 is pivoted by the drive 33, the connecting region 83 is moved on a virtual circular path 93. Since the drive 33 is arranged to the left of the connecting region 83, the end of the second component mixing flap which faces the connecting region 83 is lifting from the flap seal 85 as the first component mixing flap 65 pivots. This significantly reduces wear to the flap seal 85 because during a pivoting movement of the first component mixing flap 65 the component mixing flap 65 is virtually moved only by one end 37 along the flap device 85. On the other hand, when the heating device 7 closes, the connecting region 83, and thus also the end of the second component mixing flap 67 facing away from the end 37, is pressed in a sealed fashion against the flap seal 85.

During a pivoting movement of the first component mixing flap 65 to the right, that is to say in the clockwise direction, the end 37 of the second component mixing flap 67 is also pressed against the sealing strip 87, thus also ensuring that the heating device 7 is closed off in a sealed fashion in this case.

After all the above, it becomes clear from FIG. 5 that the mixing flap 11 can be influenced in various ways: it is possible to provide one flap seal 85, 87 in each case directly on the component mixing flaps 65 and 67. However, said flap seals 85, 87 may also be provided on the sealing edges 70 and 70a. In particular if the second flap seal 89 is not provided on the first component mixing flap 65 but rather, as indicated by the line 91, on the sealing edge 70, the first component mixing flap 65 can serve exclusively as an activation element for the second component mixing flap 67. This closes, as is apparent, for example, from FIG. 3, the first flow path 15 by the end 37 bearing against the flap seal 85, on the one hand, and by the connecting region 83 bearing against the inside of the housing 31, on the other side.

The invention claimed is:

1. An air conditioner housing, comprising:
    an evaporation device;
    a heating device;
    an interior space in which air flow paths are formed, wherein the air flow paths comprise a first air flow path and a second air flow path;
    a surrounding housing which surrounds the interior space; and
    an air control device having a first mixing flap assigned to the first air flow path, and a second mixing flap assigned to the second airflow path,
    wherein the first and second mixing flaps each completely open their respectively assigned air flow path in a first functional position and completely close their respectively assigned air flow path in a second functional position,
    wherein the first and second mixing flaps in their respective first functional positions close off the heating device in a planar fashion such that air is completely lead past sides of the heating device,
    wherein each of the first and second mixing flaps comprise a first component mixing flap, a second component mixing flap, and a connecting region which connects the first and second component mixing flaps to one another in a movable fashion, and wherein, for each of the first and second mixing flaps, a first flap seal is provided at least in a region of the second component mixing flap, the first flap seal being pressed in a planar fashion against an underside of the second component mixing flap at least in the first functional position, the first flap seal extending beyond the connecting region such that, in the first functional position, the first component mixing flap also bears in part against the first flap seal.

2. The air conditioner housing as claimed in claim 1, wherein a third air flow path and a fourth air flow path are formed, and wherein the air control device has a third mixing flap assigned to the third airflow path, and a fourth mixing flap assigned to the fourth airflow path.

3. The air conditioner housing as claimed in claim 1, wherein the first and second mixing flaps are assigned to a warm air stream and close it off completely in their first functional position.

4. The air conditioner housing as claimed in claim 1, wherein the first and second mixing flaps are each assigned to a separate warm air stream.

5. The air conditioner housing as claimed in claim 1, wherein the first and second mixing flaps are embodied in symmetrical pair.

6. The air conditioner housing as claimed in claim 1, wherein the first and second component mixing flaps of each of the first and second mixing flaps are connected to one another by a film hinge.

7. The air conditioner housing as claimed in claim 1, wherein the first and second mixing flaps are mounted at one of their respective ends in a slotted guide mechanism and coupled at the other of their respective ends to a drive.

8. The air conditioner housing as claimed in claim 1, wherein the first and second mixing flaps are provided on their respective side edges with a sealing device selected as a sealing edge.

9. The air conditioner housing as claimed in claim 1, wherein at least one sealing edge interacts with one of the first and second mixing flaps and is provided on an inner wall of the surrounding housing.

10. The air conditioner housing as claimed in claim 1, wherein different flow paths for different outlets can be formed in the surrounding housing's interior.

11. The air conditioner housing as claimed in claim 10, wherein the first and second air flows are assigned to outlets and are influenced by the first and second mixing flaps.

12. The air conditioner housing as claimed in claim 1, wherein each of the first and second mixing flaps are mounted at one of their respective ends to a drive, and wherein the drives of the first and second mixing flaps are arranged at a distance from one another on opposite sides of the heating device.

13. The air conditioner housing as claimed in claim 1, wherein the first and second mixing flaps are mounted at one of their respective ends to one drive such that the first and second mixing flaps are assigned to the one drive.

14. The air conditioner housing as claimed in claim 1, wherein each of the first and second mixing flaps are mounted at one of their respective ends to a drive such that each of the first and second mixing flaps is assigned a separate drive.

15. The air conditioner housing as claimed in claim 1, wherein the heating device is arranged centrally in the surrounding housing.

16. The air conditioner housing as claimed in claim 1, wherein, in their first functional position the first and second mixing flaps bear against a heater device housing of the heating device.

* * * * *